No. 883,073. PATENTED MAR. 24, 1908.
J. L. ALLENDER.
COMBINED CORN HARVESTER AND HUSKER.
APPLICATION FILED AUG. 22, 1906.
4 SHEETS—SHEET 2.
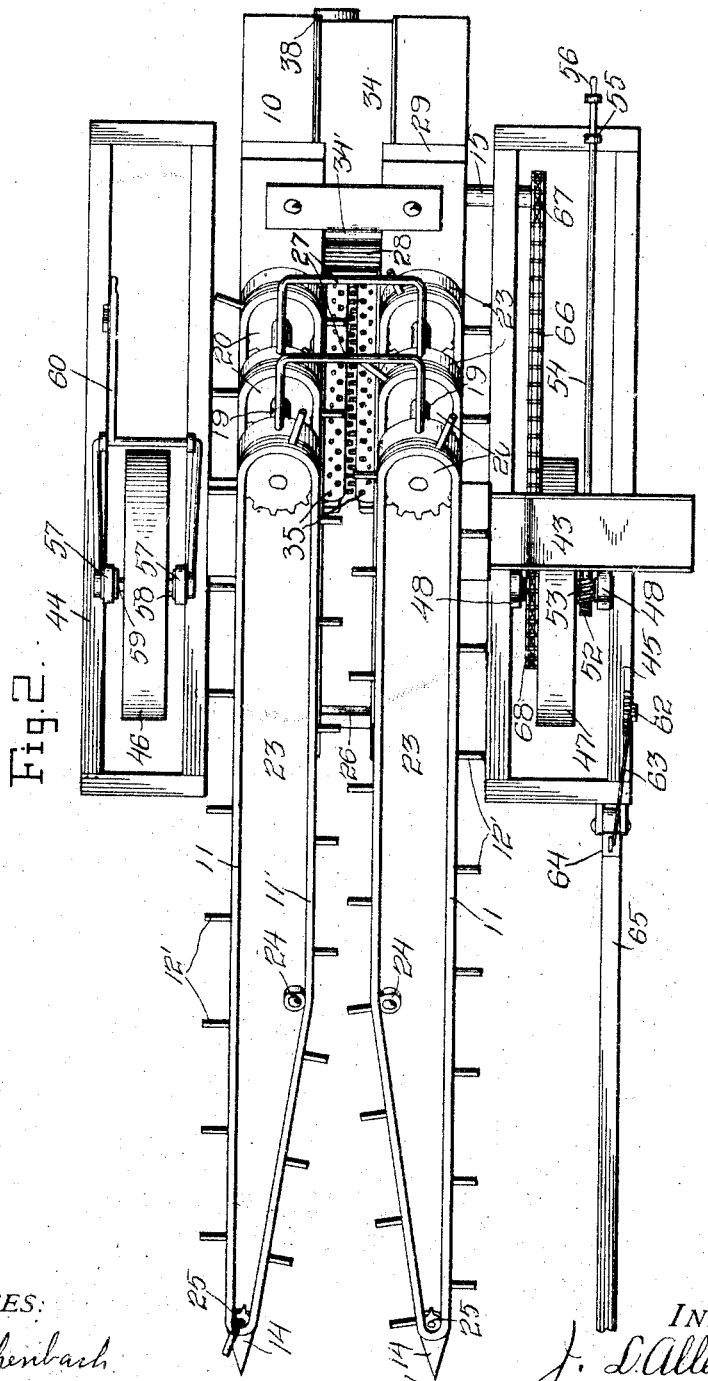
WITNESSES:
INVENTOR
J. L. Allender
BY
Attorneys No. 883,073. PATENTED MAR. 24, 1908.
J. L. ALLENDER.
COMBINED CORN HARVESTER AND HUSKER.
APPLICATION FILED AUG. 22, 1906.
4 SHEETS—SHEET 3.
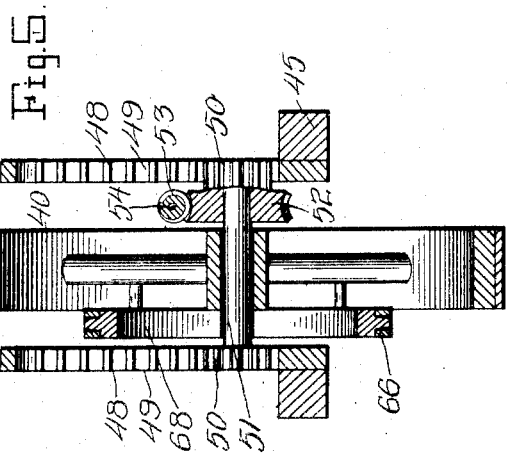
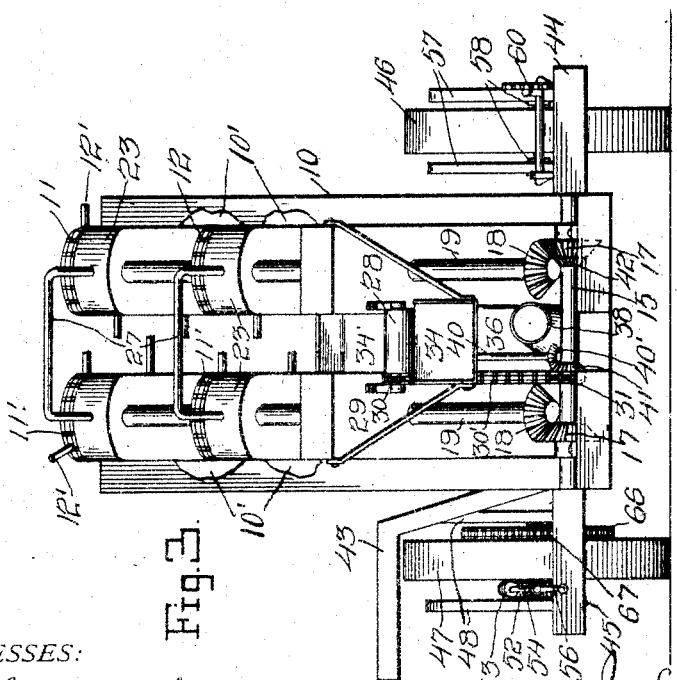

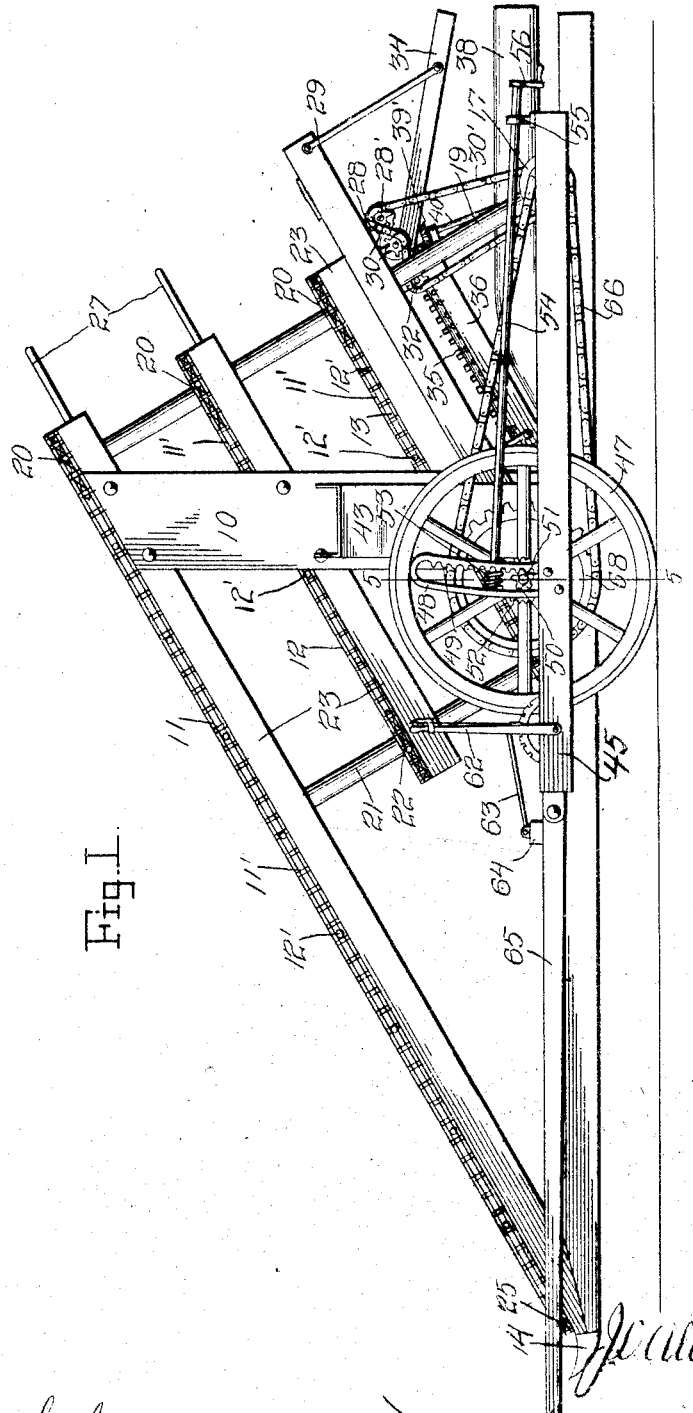

No. 883,073. PATENTED MAR. 24, 1908.
J. L. ALLENDER.
COMBINED CORN HARVESTER AND HUSKER.
APPLICATION FILED AUG. 22, 1906.
4 SHEETS—SHEET 4.
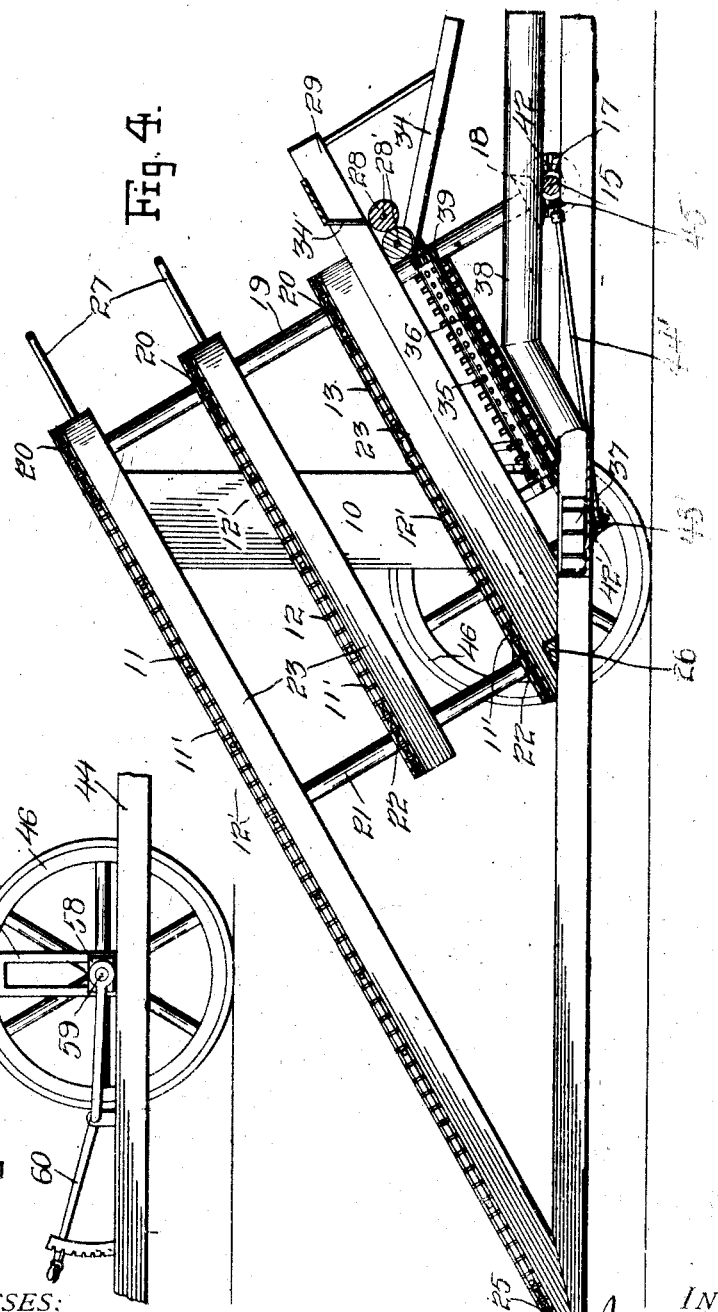
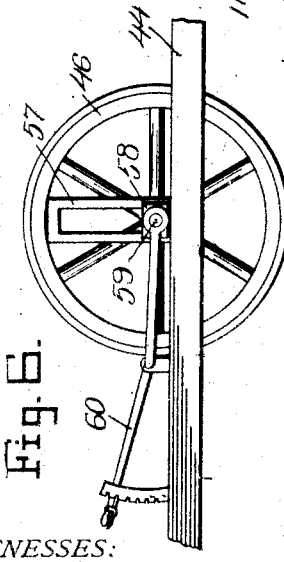
WITNESSES:
E. K. Reichenbach.
James W. Quinn
INVENTOR
J. L. Allender
BY Chandlee & Chandlee
Attorneys

UNITED STATES PATENT OFFICE.

JAMES L. ALLENDER, OF ARLINGTON, INDIANA.

COMBINED CORN HARVESTER AND HUSKER.

No. 883,073.   Specification of Letters Patent.   Patented March 24, 1908.

Application filed August 22, 1906. Serial No. 331,647.

*To all whom it may concern:*

Be it known that I, JAMES L. ALLENDER, a citizen of the United States, residing at Arlington, in the county of Rush, State of Indiana, have invented certain new and useful Improvements in Combined Corn Harvesters and Huskers; and I do hereby declare the following to be a full, clear, and exact description of the invention, such as will enable others skilled in the art to which it appertains to make and use the same.

This invention relates to combined corn harvesters and huskers, the general object thereof being to construct a simple, efficient, and durable machine of that type, capable of cutting the corn stalks as the machine is run through the field, elevating the stalks to a point in the machine where they are seized by the snapping rolls and the ears removed therefrom, shucking the ears and separately removing the stalks, ears, and shuck from the machine.

The particular improvements consist in the construction of the gathering elevators, the operation of the same, the construction of the shucking rolls, and in the means for separately removing the ears, stalks, and shuck from the machine.

Further improvements consist in the means for forcing the stalks from the elevators to the snapping rolls, and in the means for adjusting the position of the main and supplemental frames of the machine.

With these ends in view, the device consists in the construction, combination and arrangement of parts, all as hereinafter described, and illustrated in the accompanying drawings, in which:

Figure 1 is a side elevation of a corn harvester and husker constructed in accordance with this invention. Fig. 2 is a top plan view of the same. Fig. 3 is a rear elevation. Fig. 4 is a vertical longitudinal section taken centrally through Fig. 2. Fig. 5 is a transverse vertical section on the line 5—5 of Fig. 1. Fig. 6 is a side elevation of a portion of the opposite side of the machine from that illustrated in Fig. 1, showing the traction wheel and slotted frames in which its axle moves.

Like parts are designated by corresponding numerals in the several views.

Referring to the drawings, 10 designates generally the main frame of the machine, which is of substantially triangular shape, and is provided with a series of three-alining pairs of elevators 11, 12, and 13, respectively, mounted one above the other in the frame. The several pairs of elevators are arranged in parallel planes and the members of each pair are spaced apart to permit the passage of the corn stalks therethrough.

As shown in Fig. 1, the uppermost pair of elevators 11 are of approximately twice the length of the intermediate and lower pairs and extend beyond the same, as shown. Each elevator comprises a sprocket chain 11', provided with fingers 12', by means of which the corn stalks are gathered and forced through the machine, the inner faces of the uprights being cut away, as indicated by the reference numeral 10', to enable said fingers to pass thereby.

Located at the rear end of the main frame is the main drive-shaft 15 of the machine, driven from one of the traction wheels, carried in one of the side frames of the machine, as afterwards described. Shaft 15 has mounted thereon a pair of oppositely facing beveled pinions 17 meshing with gears 18, mounted on the lower ends of the elevator shafts 19, said shafts being inclined upwardly and forwardly and provided with sprockets 20, upon which the several sprocket chains of the elevator run. The main frame is likewise provided with a pair of shafts 21 inclined in similar fashion with the elevator shafts and provided with sprockets 22, upon which the lower ends of the chains of the elevators 12 and 13 run. The various shafts above mentioned are supported and passed through inclined braces 23, connected with the main frame and parallel with the stretch of the elevator chains, which travel along the upper face of said braces.

The uppermost pair of braces are cut away at their lower ends, as shown, and their chains are held in place thereon by idlers 24. Said braces are likewise provided at their lower ends with a small sprocket wheel 25 for the accommodation of said sprocket chains. The lower beams of the main frame are likewise cut away in similar fashion at their front ends, thus forming with the upper braces and chains an inwardly converging opening, by means of which the corn stalks are more easily guided through the machine.

The lower end of the lowermost pair of braces carries a knife 26 arranged transversely therebetween, by means of which the corn stalks, when they reach this point in their passage through the machine, are severed at a slight distance from the ground.

Each pair of braces is connected at its rear end by a bent rod 27, as shown in Fig. 3, such rods acting as stops or packers, and tending to force the corn stalks into the bight of a pair of snapping rolls 28, mounted on shafts 28' carried in brackets located on the underside of braces 29 of the main frame, and provided upon one end with sprocket wheels 30, driven by a sprocket chain 30' passing over one of said sprockets and under the other and over a sprocket wheel 31, mounted on the main drive shaft, said sprocket chain likewise passing over an idler 32, mounted upon a stub shaft carried in one of said braces. By the provision of the idler, the snapping rolls are run toward each other and the corn stalks' passing therebetween will be removed from the machine by a chute 34, located therebeneath, an inclined guide 34' extending transversely between braces 29, and thus preventing the stalks from reaching the chute without passing through the snapping rolls.

On the passage of the stalks through the snapping rolls, the ears of corn will be squeezed or snapped off the stalks by the action of the rolls, which are provided for this purpose with longitudinal ridges. The snapped ears then fall between a pair of shucking rollers 35, the surface of which is provided with small pin-points or projections, which remove the shuck from the ear, whence the shuck falls along an inclined chute 36 to the bottom of the machine and is blown by means of a fan 37 through a pipe 38 out of the machine. The upper ends of the shucking rollers are provided with intermeshing pinions 39, one of which is driven by a gear 39' upon the upper end of an inclined shaft 40 having a gear 40' meshing with a beveled pinion 41 upon the main drive shaft. The shaft of the fan 37 is likewise provided with a pinion 42' in mesh with the pinion 43', mounted on the forward end of a longitudinally disposed shaft 44', which last mentioned shaft carries on its rear end a pinion 45', which meshes with a pinion 42 on the main drive shaft 15. Pinions 41 and 42 on the main drive shaft are formed much larger than those on the fan and shucking roller drive shafts so that the latter shafts will be rotated at a greater speed than the former.

The space between the shucking rollers is sufficiently large to permit the ears of corn to project part way therethrough, that the shuck may be more readily removed by the projections on the roller. The ears of corn thus shucked pass out through a chute 43 mounted upon one side of the main frame, each ear being forced along said chute by the succeeding ears.

Mounted at each side of the main frame are supplemental frames 44 and 45, in which fit the traction wheels 46 and 47, respectively, the latter of which is likewise the master wheel of the machine. The frame 45 carries upon its side sills a pair of alining rectangular racks 48 one side of which is provided upon its inner face with teeth 49, with which engage a pair of pinions 50 mounted upon opposite ends of the axle 51 of the master wheel. One of said pinions is formed integral with a worm wheel 52 rotated by means of a worm 53 formed upon one end of a rod 54 carried in a bracket 55 mounted upon the frame 45 towards its rear end, the opposite end of said rod having an operating crank 56. The opposite frame 44 carries a pair of vertical frames 57 similar to racks 48, the bearing-blocks 58 of the axle 59 of the traction wheel 46 being movably mounted in the openings or slots therein, the outer end of the said axle being connected with an operating lever 60 carrying a spring pressed dog engaging in a segmental rack carried upon the outer frame sill. By the above described means, the main frame 10, which is rigidly connected with the supplemental frames, may be raised or lowered upon the traction wheel axles, upon the rotation of the worm wheel 52, or movement of the operating lever 60. The frame 45 is further provided with a lever 62 pivoted thereto and connected by a link 63 with a block 64 secured to the tongue 65 of the machine pivoted to the front end of the frame, which latter is provided with the usual segmental rack with which the dog of the lever 62 engages. A forward movement of said lever will therefore tilt the front end of the machine downwardly, while a reverse movement of the lever will in like manner raise the front end, the link connection between the lever and tongue-block readily effecting such tilting movement.

The main drive shaft is rotated through the medium of a sprocket chain 66 passing over a sprocket wheel 67 thereon, and over a sprocket wheel 68 rigidly secured to the axle 51 of the master wheel, the rotation of which latter effects the rotation of the sprocket wheel 68.

The operation of the entire machine will be readily understood from the foregoing, and an extended description is therefore deemed unnecessary.

What is claimed, is:—

In a machine of the class described, in combination, a main frame; a supplemental frame rigidly connected to the main frame at each side thereof; a member secured to a side sill of each supplemental frame and provided with a vertical opening; a traction wheel carried by each supplemental frame and having the opposite ends of its axle loosely fitting in the openings in the adjacent members; means mounted upon said supplemental frames for bodily raising or lowering the same and said main frame relatively to said traction wheels; separate means mounted on one of said supplemental frames and connected with said main frame, for tilting said frames; a plurality of pairs of upwardly and rearwardly inclined elevators mounted one above another on said main frame; stalk-cutting means connected to the lowest elevators; a drive-shaft carried by said main frame and operatively connected with one of said traction wheels; driving connections between said shaft and said elevators for operating all of the latter simultaneously; snapping rollers mounted in the rear of said main frame and operatively connected with said shaft; means carried by said elevators for forcing the cut stalks between said snapping rollers; and a pair of shucking rollers operatively connected with said shaft and disposed adjacent said snapping rollers.

In testimony whereof, I affix my signature, in presence of two witnesses.

JAMES L. ALLENDER.

Witnesses:
 JACOB ADAMS,
 JAMES HAVENS.